Patented July 31, 1928.

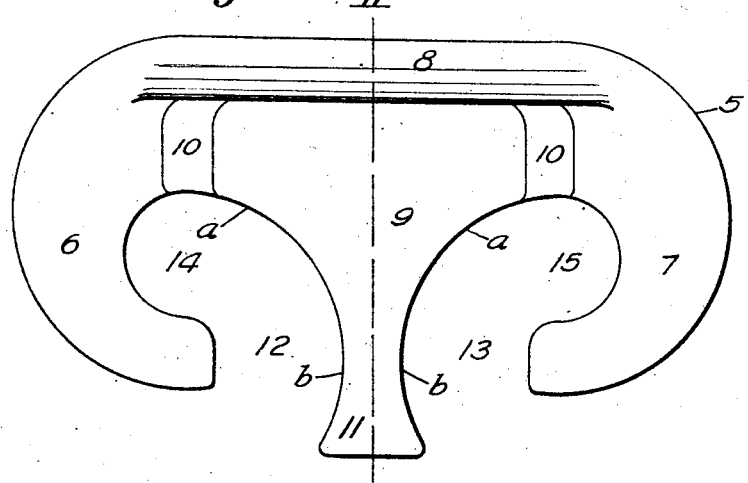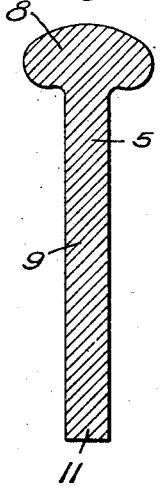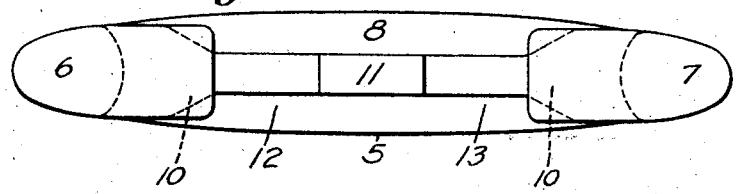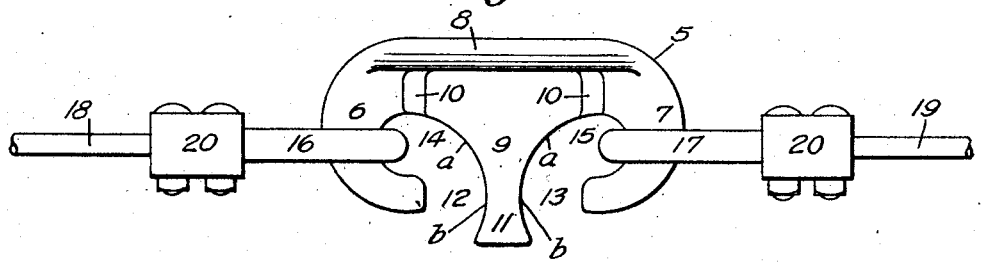

1,679,042

UNITED STATES PATENT OFFICE.

JOHN D. LEMEX, OF TULSA, OKLAHOMA.

LINK.

Application filed November 8, 1927. Serial No. 231,861.

My invention relates to improvements in links, and more particularly to a new and improved link construction especially designed for connecting sections of rods employed in apparatus for pumping oil wells, although it may be advantageously used for other purposes. Links of this character are relatively heavy and rather difficult to handle in the act of applying them to the connecting rods and disconnecting the rods, and, due to their construction as heretofore followed, numerous accidents have been met with in using the links.

Among the objects of the present invention are, to provide a simple and strong link of the character specified embodying means for safely handling the link during the act of connecting and disconnecting the rods with which the link is employed; and to provide a link construction having means that will effect a quick, positive, and safe disconnection when it is desired to disconnect the rods.

Further additional objects and advantages of the present invention will be pointed out or become apparent from a consideration of an operative embodiment as hereinafter described and as shown by the accompanying drawings.

In the drawings, which illustrate an application of my invention:

Fig. 1 is a side elevational view of a link embodying my invention;

Fig. 2, a vertical sectional view taken on the line II—II of Fig. 1;

Fig. 3, a bottom plan view; and

Fig. 4, a diagrammatic elevational view, showing the link joining the rod loops of two connecting rods.

Referring to the drawings, and as preferred, the link embodying my invention comprises a body portion, designated generally by the numeral 5; this body is generally elliptical or approaching elliptical form and is provided with hook portions 6 and 7. The upper longitudinally extending portion of the body is formed to provide a convenient hand grip portion 8 enabling an operator to grasp the link by this portion without inserting his hand through an opening in the link or placing it in any position that would be liable to cause injury thereto, particularly during the operation of disconnecting the rods with which the link is employed.

Extending longitudinally of the body directly under the portion 8 thereof and from the upper or inner end of hook-portion 6 to a corresponding end of hook-portion 7, I provide a web or member 9. Member 9 is reinforced or thickened at the points 10 and these reinforced portions merge into the body.

This member 9 with its reduced depending part or portion 11 forms an important and characteristic feature of the present invention, and, as illustrated, part 11 extends downwardly between the hook-portions 6 and 7 and has its free end projected beyond the free ends of the said hook-portions. The member 9 is formed with curved edge faces $a$, and the part 11 of the said member, with curved edge faces $b$; these curved edges taken in connection with the inner curved faces of the hook-portions form openings adapted to receive the loops of the connecting rods. As shown, 12 and 13 designate loop or tool entering slots arranged at an angle with the respective openings 14 and 15.

In Fig. 4 of the drawings I have shown the link applied to loop members 16 and 17 of two connecting rods 18 and 19 of oil well pumping apparatus; said loop members are secured to the respective rods by clamps 20.

From the foregoing description it will be understood that in the operation of disconnecting the rods, with the link held stationary and one of the rods moved relatively to the link, the loop of the moving rod will be forced into sliding contact with the curved faces $a$ and $b$ of member 9, and, due to the configuration shown, will be moved from its receiving opening into the entering or exit slot and be freed from the link. Further, by the provision of the hand gripping portion 8 the link may be handled with ease and safety.

It will also be understood that in connecting the rods the link is applied to a loop of one of the rods, then held stationary, and the loop of the other rod is entered in the other leading-in slot of the link and is caused, due to the shape of the curved portion of member 9, to be carried into operative position within the loop receiving opening of the link.

What I claim is:

1. A link comprising a body provided with hook end portions and a member interposed between the said portions and forming therewith spaced apart openings, said member having a relatively wide portion adjacent the body and a relatively narrow portion projected beyond the free ends of the hook portions to form with said portions entering and exit slots disposed at an angle with the said openings and formed with curved engaging faces to facilitate the application and removal of looped members.

2. A link comprising a body provided with hook end portions and a member interposed between the said portions and forming therewith spaced apart openings, said member having curved walls and a relatively narrow portion projected beyond the free ends of the hook portions to form with said portions entering and exit slots disposed at an angle with the said openings.

3. A link for connecting sections of rods including a body having hook portions at each end thereof, a centrally disposed member projecting from the body and located between the hook portions and forming therewith loop receiving openings, said member having a relatively narrow portion projected beyond the free ends of the hook portions to form with said portions entering and exit slots disposed at an angle with the loop receiving openings and formed with curved engaging faces to facilitate the application and removal of looped members.

4. A link of the character described including a body having a hand gripping portion thereon and provided with hook end portions, a member interposed between the said end portions and forming therewith spaced apart loop receiving openings.

5. A link of the character described including a body having a hand gripping portion thereon and provided with hook end portions, a member interposed between the said end portions and forming therewith spaced apart loop receiving openings, said member having curved guiding walls.

In testimony whereof I affix my signature.

JOHN D. LEMEX.